(12) United States Patent
Kim

(10) Patent No.: US 11,427,258 B2
(45) Date of Patent: Aug. 30, 2022

(54) FENDER MOUNTING STRUCTURE OF VEHICLE

(71) Applicants: HYUNDAI MOTOR COMPANY, Seoul (KR); KIA CORPORATION, Seoul (KR)

(72) Inventor: Eonpyo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/232,473

(22) Filed: Apr. 16, 2021

(65) Prior Publication Data

US 2022/0105988 A1 Apr. 7, 2022

(30) Foreign Application Priority Data

Oct. 5, 2020 (KR) ........................ 10-2020-0127777

(51) Int. Cl.
*B62D 25/02* (2006.01)
*B62D 65/16* (2006.01)

(52) U.S. Cl.
CPC ............. *B62D 25/02* (2013.01); *B62D 65/16* (2013.01)

(58) Field of Classification Search
CPC ...... B62D 25/02; B62D 25/08; B62D 25/088; B62D 25/12; B62D 25/105; B62D 25/16; B62D 65/16
See application file for complete search history.

(56) References Cited

FOREIGN PATENT DOCUMENTS

| JP | H0611898 Y2 | * | 3/1994 | ............. B62D 25/18 |
|---|---|---|---|---|
| JP | 4122680 B2 | * | 7/2008 | ............. B60R 21/34 |
| JP | 4140186 B2 | * | 8/2008 | ............. B60R 21/34 |
| JP | 4762438 B2 | * | 8/2011 | ............. B60R 21/34 |

* cited by examiner

*Primary Examiner* — Bayan Salone
(74) *Attorney, Agent, or Firm* — Lempia Summerfield Katz LLC

(57) ABSTRACT

A fender mounting structure of a vehicle includes: a fender mounting bracket assembly; and a support bracket assembly that includes an inner flange formed toward inside and an outer flange formed outside in a width direction of the vehicle. In particular, the support bracket assembly is mounted through the inner flange on an outer side of a fender apron upper member along the width direction and disposed along the width direction between the fender apron upper member and a mount end of a fender panel. The fender mounting bracket assembly is mounted on the outer flange of the support bracket assembly and connected to the mount end of the fender panel.

13 Claims, 9 Drawing Sheets

FENDER MOUNTING STRUCTURE OF VEHICLE

CROSS-REFERENCE TO RELATED APPLICATION

This application claims priority to and the benefit of Korean Patent Application No. 10-2020-0127777, filed on Oct. 5, 2020, the entire contents of which are incorporated herein by reference.

FIELD

The present disclosure relates to a front vehicle body structure of a vehicle. More particularly, the present disclosure relates to a fender mounting structure of a vehicle.

BACKGROUND

The statements in this section merely provide background information related to the present disclosure and may not constitute prior art.

In general, a front vehicle body for a vehicle is a skeleton structure that is positioned in the front along the length direction of the vehicle and forms an engine room.

The front vehicle body has front fender aprons forming the left and right sides of the engine room. The front fender apron forms a space where the suspension is mounted and the wheel is installed.

Furthermore, the front vehicle body constitutes a fender between the hood and wheel guard. Here, the fender is mounted on the upper member of the fender apron. In the front vehicle body according to an example, the parting line of the hood is formed on the upper member of the fender apron.

In the front vehicle body to which such a hood is applied, the fender parting line is positioned on the upper part of the fender apron, so a separate fender mounting bracket is mounted on the upper part of the fender apron along the up and down directions, and the fender is mounted on a fender mounting bracket.

Meanwhile, recently, a clamshell type hood, which is advantageous in terms of fuel efficiency and design, has been applied to the front vehicle body. The clamshell hood has a parting line formed outside along the vehicle width direction of the upper member of the fender apron, and is a type that can cover the side of the fender.

Therefore, in order to apply the clamshell hood whose size is increased to the outside of the vehicle width direction as described above to the front vehicle body, it is desired to secure the strength of a mounting bracket for mounting the fender to the upper member of the fender apron.

The above information disclosed in this Background section is only for enhancement of understanding of the background of the present disclosure, and therefore it may contain information that does not form the prior art that is already known to a person of ordinary skill in the art.

SUMMARY

The present disclosure provides a fender mounting structure of a vehicle to secure the strength of the fender by mounting a fender spaced outward from the upper member of the fender apron.

According to an exemplary form of the present disclosure, a fender mounting structure of a vehicle may include: a support bracket assembly including an inner flange formed toward inside and an outer flange formed outside in a width direction of the vehicle, wherein the support bracket assembly is mounted through the inner flange on an outer side of a fender apron upper member along the width direction, and disposed between the fender apron upper member and a mount end of a fender panel along the width direction; and a fender mounting bracket assembly mounted on the outer flange of the support bracket assembly and connected to the mount end of the fender panel.

The support bracket assembly may include an upper support bracket connected to the fender apron upper member, and a lower support bracket disposed on the lower part of the upper support bracket.

The fender mounting bracket assembly may include a front fender mounting bracket and a rear fender mounting bracket, which are separately connected along the vehicle body length direction on the front and rear sides of the outer flange of the support bracket assembly.

The upper support bracket may include a first welding surface formed on the inner flange to be connected to the outer surface of the fender apron upper member, and a second welding surface formed on the outer flange to be connected the front fender mounting bracket and the rear fender mounting bracket.

The upper support bracket may further include a concave forming portion connected to the inner flange between the inner flange and the outer flange.

The upper support bracket may further include a convex forming portion connected to the concave forming portion and the outer flange, wherein the convex forming portion is formed in parallel to the mount end of the fender panel.

A down flange may be formed at the front end of the concave forming portion and the front end of the convex forming portion, respectively.

The lower support bracket may include a third welding surface formed to be connected to the lower surface of the fender apron upper member on one side, and a fourth welding surface formed on the other side to be connected to the lower surface of the upper support bracket.

The lower support bracket may further include an opening surface with an opening formed between the third welding surface and the fourth welding surface, and a stepped portion stepped upward from the opening surface to the fourth welding surface.

The lower support bracket may further include a third forming portion formed from the edge of the opening in a downward direction.

The front fender mounting bracket may include a mount reinforcement formed at the front end as a "U" cross-section shape open in the lower direction.

The front fender mounting bracket may further include a fifth welding surface connected to the mount reinforcement and connected to the outer flange of the upper support bracket, and a first mount surface connected to the fifth welding surface and connected to the mount end of the fender panel.

The rear fender mounting bracket may include a sixth welding surface connected to the fifth welding surface and connected to the outer flange of the upper support bracket, and a second mount surface connected to the sixth welding surface and connected to the mount end of the fender panel.

An exemplary form of the present disclosure may secure strength for a fender mounting bracket assembly and fender through a support bracket assembly in a vehicle to which a clamshell type hood is applied, and improve the assemble quality of the fender.

In addition, the effect obtained or predicted by an exemplary form of the present disclosure will be disclosed directly or implicitly in the detailed description of an exemplary form of the present disclosure. That is, various effects predicted according to an exemplary form of the present disclosure will be disclosed within a detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
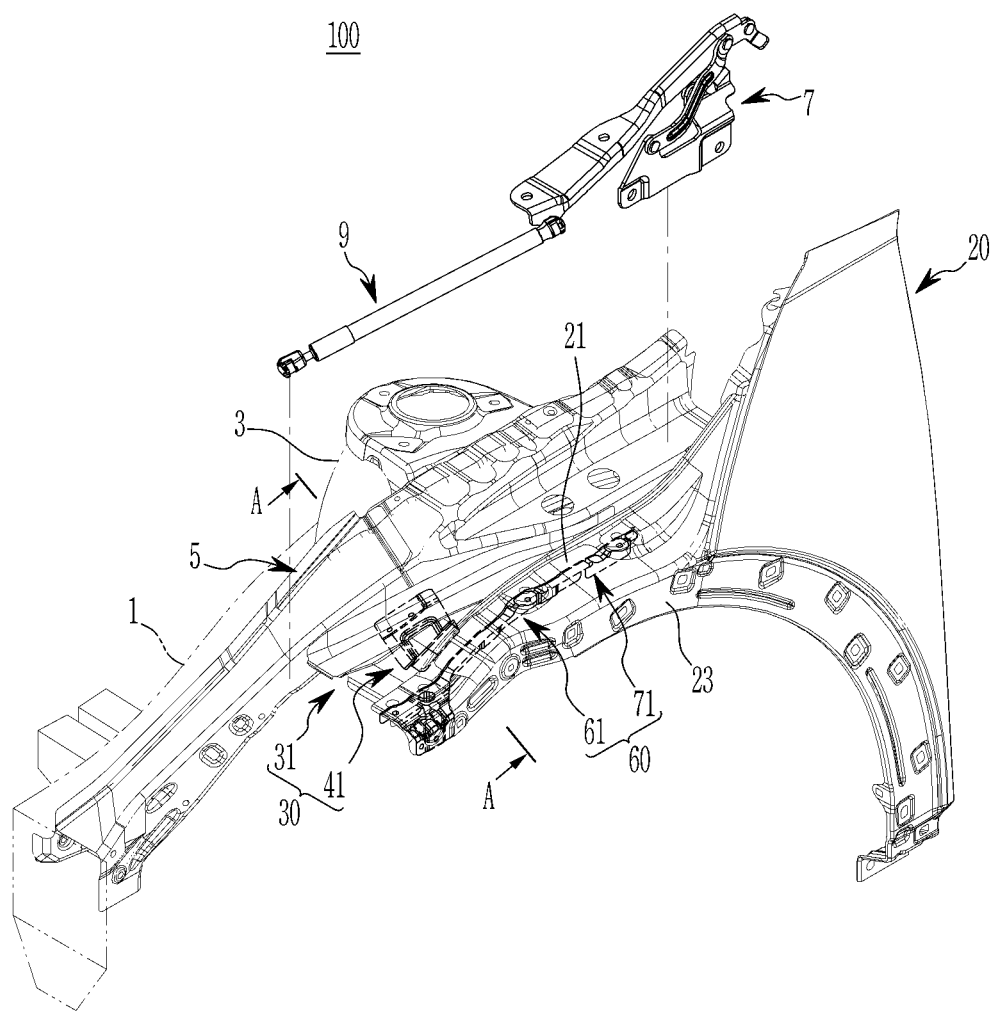
FIG. 1 is a perspective view showing a fender mounting structure of a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In order to clearly describe the present disclosure, parts irrelevant to the description are omitted, and the same reference numerals are assigned to the same or similar components throughout the specification.

The size and thickness of each component shown in the drawings are shown arbitrarily for convenience of description, and the present disclosure is not necessarily limited to those shown in the drawings, and the thickness is enlarged to clearly express various parts and regions.

In addition, in the following detailed description, the names of the configurations are divided into first, second, etc. to distinguish the configurations in the same relationship, and are not necessarily limited to the order in the following description.

Throughout the specification, when a part includes a certain component, it means that other components may be further included rather than excluding other components unless otherwise specified.

In addition, terms such as . . . part, . . . means, etc. described in the specification mean a unit of a comprehensive structure that performs at least one function or operation.

Figure 2:
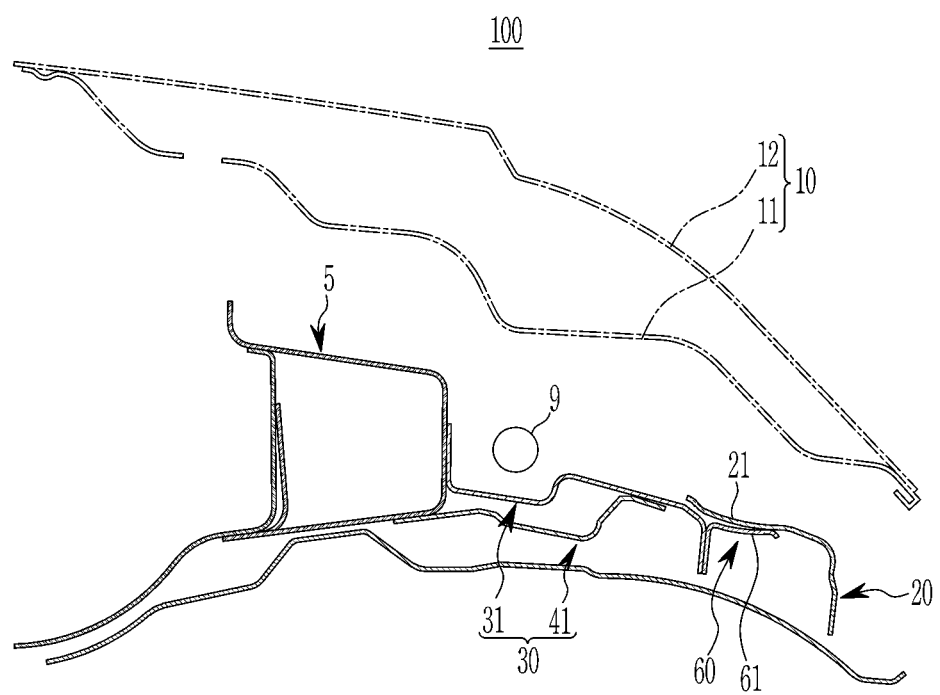
FIG. 2 is a cross-sectional view along line A-A in FIG. 1.

FIG. 1 is a perspective view showing a fender mounting structure of a vehicle according to an exemplary form of the present disclosure, and FIG. 2 is a cross-sectional view along line A-A in FIG. 1.

Referring to FIG. 1 and FIG. 2, a fender mounting structure 100 according to an exemplary form of the present disclosure may be applied to a front structure of a vehicle including a hood of a clam shell type.

In the drawings, only the front part on the left side of the vehicle body is shown for convenience of understanding, but it should be understood that the front part on the right side of the vehicle body is also provided in a symmetrical shape of the same configuration.

The front structure includes a fender apron 3 mounted on both front side member 1 respectively and a fender apron upper member 5 mounted on upper part of the fender apron 3.

The basic configuration of such a front structure is a configuration well known in the art, and a more detailed description of the configuration in the present specification will be omitted.

In the industry, the vehicle width direction is called L direction, the front and rear direction of the vehicle body is called the T direction, and the height direction of the vehicle body is called H direction. However, in an exemplary form of the present disclosure, instead of setting the LTH direction as described above as the reference direction, the constituent elements below will be described by setting the vehicle width direction, vehicle body length direction and up and down direction.

Further, the vehicle body length direction described above may be defined as a direction along the front and rear of the vehicle body, and both sides in the following may be defined as both sides along the vehicle width direction. In the following, the inner side may be defined from both sides toward the vehicle center, and the outer side may be defined from the vehicle center toward both sides.

Further, the end (one/one end or the other/one end) in the following may be defined as either end, and a certain part including the end.

A clamshell type hood 10 in the front structure as described above includes hood panels 11 and 12 forming a hood parting line spaced outward from the fender apron upper member 5.

The hood panels 11, and 12 are rotatably installed to the fender apron upper member 5 through a hinge bracket 7.

Further, the front structure includes a fender panel 20 provided on the parting line side of the hood panels 11 and 12.

The hood panels 11, and 12 cover the sides of the fender panel 20 and may be hinged in up and down directions through the hinge bracket 7. Accordingly, in an exemplary form of the present disclosure, the hood 10 to which the hood panels 11 and 12 are applied may be defined as a clamshell type hood.

In addition, as described above, the front structure including the clamshell type hood 10 includes a gas lifter 9. The front end of the gas lifter 9 is connected to the fender apron upper member 5, and the other end is connected to the hinge bracket 7.

Since the configuration of the hinge bracket 7 and the gas lifter 9 as described above is made of a known technology well known in the art, a more detailed description of the configuration will be omitted in this specification.

In the fender mounting structure 100 according to an exemplary form of the present disclosure, the fender panel 20 is mounted on the vehicle body including the clamshell type hood panels 11 and 12 by being spaced outward from the fender apron upper member 5, and it has a structure that may secure the strength of the fender panel 20.

To this end, the fender mounting structure 100 of the vehicle according to an exemplary form of the present disclosure basically includes a support bracket assembly 30 and a fender mounting bracket assembly 60.

In an exemplary form of the present disclosure, the support bracket assembly 30 is for substantially mounting the fender panel 20 in a position spaced outward from the fender apron upper member 5.

Also, the support bracket assembly 30 substantially supports the fender panel 20 mounted to be spaced outward from the fender apron upper member 5.

This support bracket assembly 30 is mounted on the outer side along the vehicle width direction of the fender apron upper member 5, and disposed between the fender apron upper member 5 and a mount end 21 of the fender panel 20 along the vehicle width direction.

Figure 3:
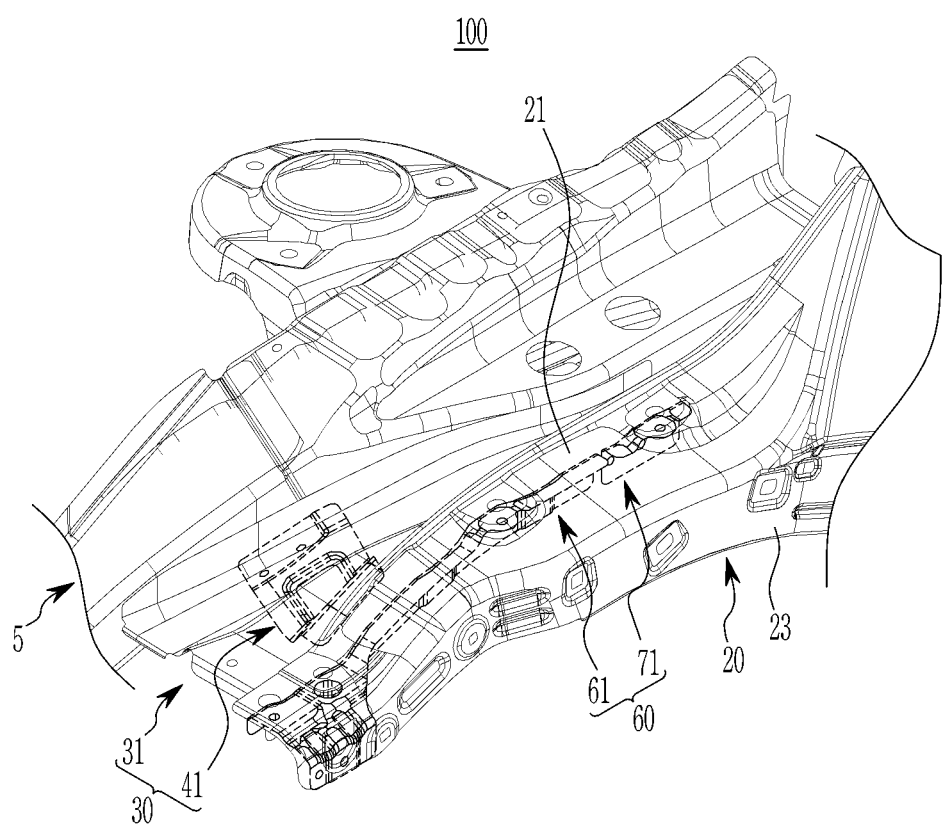
FIG. 3 is a perspective view of a support bracket assembly and a fender mounting bracket assembly applied to a fender mounting structure of a vehicle according to an exemplary form of the present disclosure.
Figure 4:
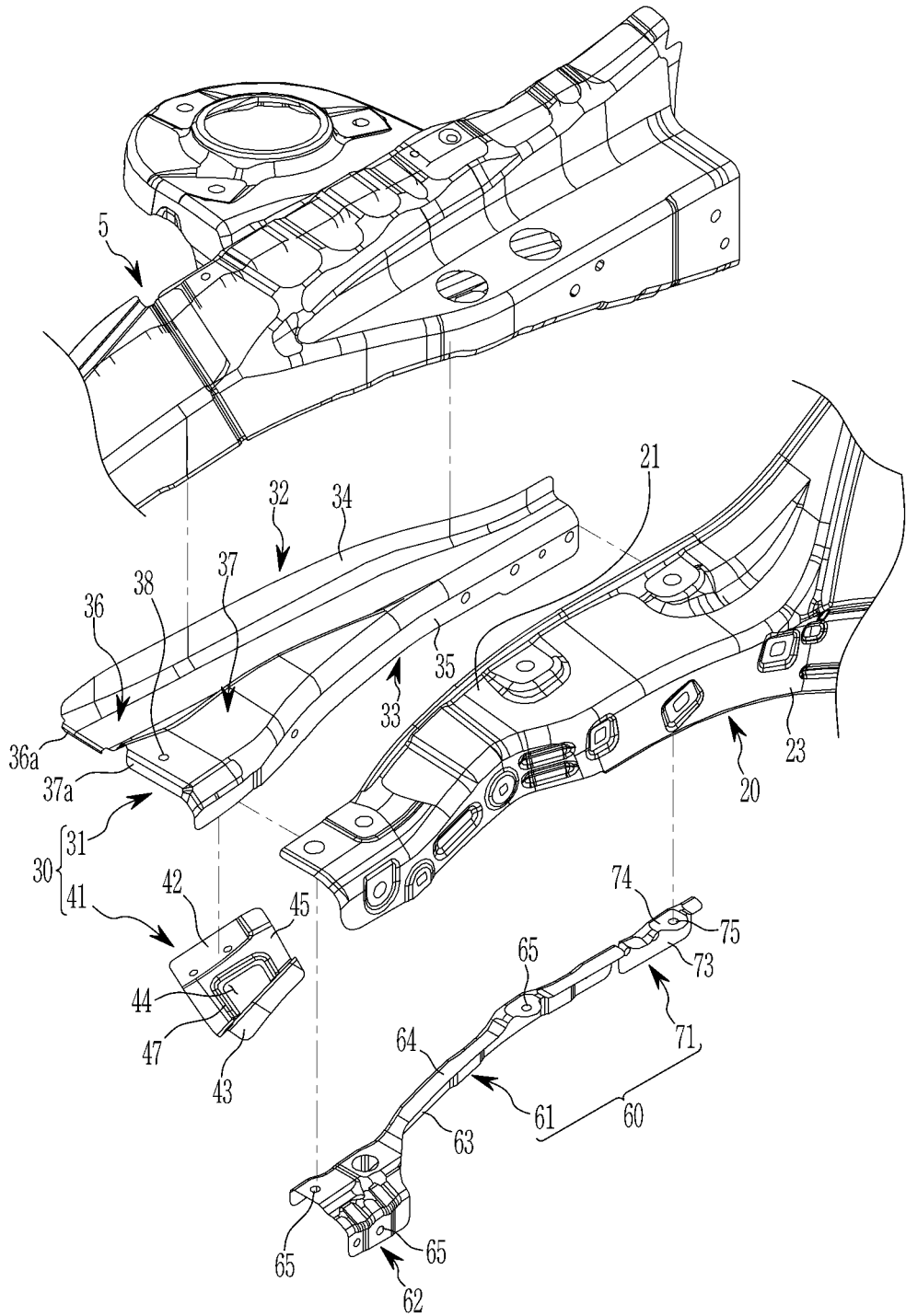
FIG. 4 is an exploded perspective view of a support bracket assembly and a fender mounting bracket assembly applied to a fender mounting structure of a vehicle according to an exemplary form of the present disclosure.

FIG. 3 is a perspective view of a support bracket assembly and a fender mounting bracket assembly applied to a fender mounting structure of a vehicle according to an exemplary form of the present disclosure, and FIG. 4 is an exploded perspective view of a support bracket assembly and a fender mounting bracket assembly applied to a fender mounting structure of a vehicle according to an exemplary form of the present disclosure.

Referring to FIG. 1 to FIG. 4, the support bracket assembly 30 according to an exemplary form of the present disclosure includes an upper support bracket 31 attached to the fender apron upper member 5 and a lower support bracket 41 disposed below the upper support bracket 31.

The upper support bracket 31 serves to substantially connect the fender apron upper member 5 and the fender mounting bracket assembly 60.

The upper support bracket 31 is formed on both sides along the vehicle width direction on the inner side along the vehicle body length direction, and the upper support bracket 31 includes an inner flange 32 mounted on the outer side along the vehicle width direction of the fender apron upper member 5 and an outer flange 33 formed outside the vehicle width direction and coupled to the fender mounting bracket assembly 60.

Here, the upper support bracket 31 is provided as a bracket having a width along the vehicle width direction gradually narrowing from the front to the rear side of the vehicle body length direction.

Figure 5:
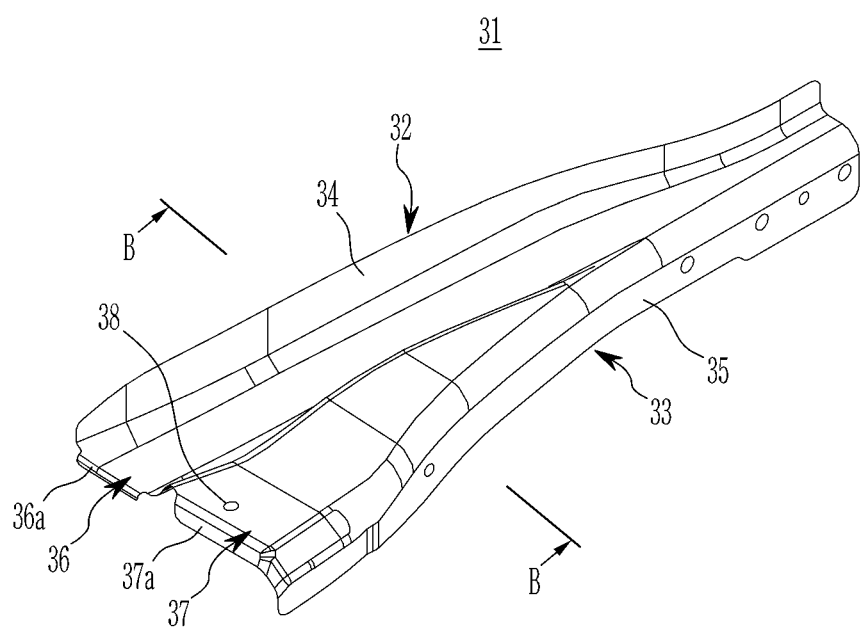
FIG. 5 is a perspective view showing an upper support bracket of a support bracket assembly applied to a fender mounting structure of a vehicle according to an exemplary form of the present disclosure.
Figure 6:
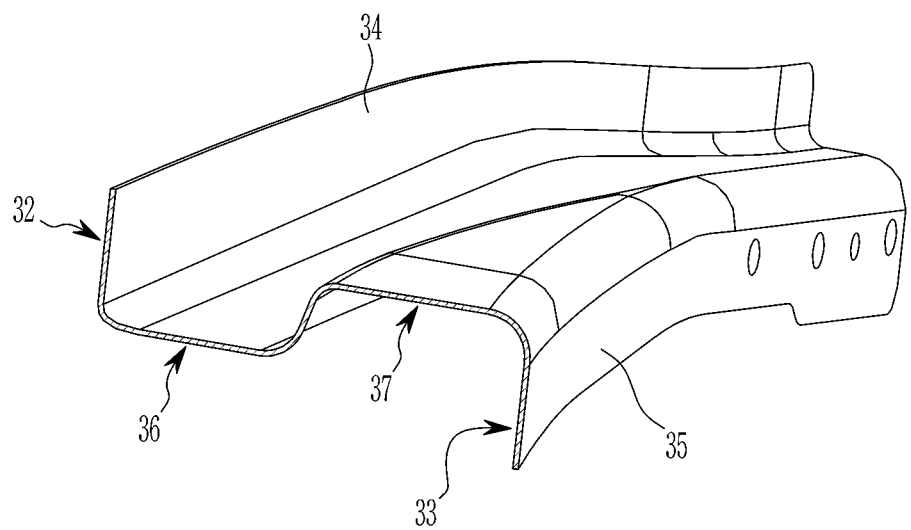
FIG. 6 is a cross-sectional perspective view along line B-B in FIG. 5.

FIG. 5 is a perspective view showing an upper support bracket of a support bracket assembly applied to a fender mounting structure of a vehicle according to an exemplary form of the present disclosure, and FIG. 6 is a cross-sectional perspective view along line B-B in FIG. 5.

Referring to FIG. 1 to FIG. 6, the upper support bracket 31 according to an exemplary form of the present disclosure includes a first welding surface 34 formed on the inner flange 32 so as to be connected to the outer surface of the fender apron upper member 5.

The inner flange 32 of the upper support bracket 31 may be spot welded along the vehicle body length direction to the outer surface of the fender apron upper member 5 through the first welding surface 34. This inner flange 32 may form the first welding surface 34 while flanging in the upper direction.

In addition, the upper support bracket 31 includes a second welding surface 35 formed on the outer flange 33 to be joined with the fender mounting bracket assembly 60, which will be described further later.

In one form, the outer flange 33 of the upper support bracket 31 may be spot welded with the fender mounting bracket assembly 60 along the vehicle body length direction through the second welding surface 35. This outer flange 33 may form the second welding surface 35 while flanging in the downward direction.

Furthermore, the upper support bracket 31 according to an exemplary form of the present disclosure further includes a first forming portion 36 and a second forming portion 37.

The first forming portion 36 is a part that disposes the gas lifter 9, and also functions to increase the strength of the upper support bracket 31. The first forming portion 36 is connected to the inner flange 32 and disposed between the inner flange 32 and the outer flange 33. The first forming portion 36 is an upwardly open concave portion and extended along the vehicle body length direction.

The gas lifter 9 is disposed to be spaced apart from the upper surface of the first forming portion 36. This is to absorb the impact transmitted to the pedestrian through the gap when a pedestrian collides with the hood panels 11, and 12 or the fender panel 20 by securing a gap between the gas lifter 9 and the first forming portion 36.

The second forming portion 37 may be formed in parallel with the mount end 21 of the fender panel 20 mounted on the fender mounting bracket assembly 60, which will be described further later.

The second forming portion 37 is a downwardly open convex portion and extended along the vehicle body length direction. The second forming portion 37 is connected to the first forming portion 36 on one side and connected to the outer flange 33 on the other side. In an exemplary form of the present disclosure, the appearance of the fender mounting structure 100 may be improved through the second forming portion 37 and the second forming portion 37 may prevent a gap between the fender panel 20 and the support bracket assembly 30 from being visible.

A first down flange 36a flanged in the lower direction is formed at the front end of the first forming portion 36 in the upper support bracket 31. In addition, a second down flange 37a flanged in the lower direction is also formed at the front end of the second forming portion 37.

A head lamp mounting portion 38 for mounting a head lamp (not shown in the drawing) is formed at the front end of the second forming portion 37.

The first down flange 36a prevents visible holes in the fender mounting structure 100. And, the second down flange 37a is provided to guide the head lamp to the head lamp mounting portion 38 when decking the head lamp to the head lamp mounting portion 38 along the vehicle body length direction.

Referring to FIG. 1 to FIG. 4, the lower support bracket 41 of the support bracket assembly 30 according to an exemplary form of the present disclosure is to reinforce the strength of the upper support bracket 31 since the mounting points of the fender apron upper member 5 and the fender panel 20 are separated from each other by the upper support bracket 31.

The lower support bracket 41 is joined to the lower surface of the fender apron upper member 5 and the lower surface of the upper support bracket 31.

The lower support bracket 41 is disposed on the front side of the upper support bracket 31. That is, the lower support bracket 41 may prevent exposure when the hood panels 11 and 12 are opened, and may be disposed on the front side of the upper support bracket 31 as much as possible in consideration of spot welding with the upper support bracket 31.

As above, the reason for dispose of the lower support bracket 41 on the frontmost side of the upper support bracket 31 is that the width of the frontmost side of the upper support bracket 31 is relatively wide, so it is more advantageous in terms of reinforcing the strength of the upper support bracket 31.

Figure 7:
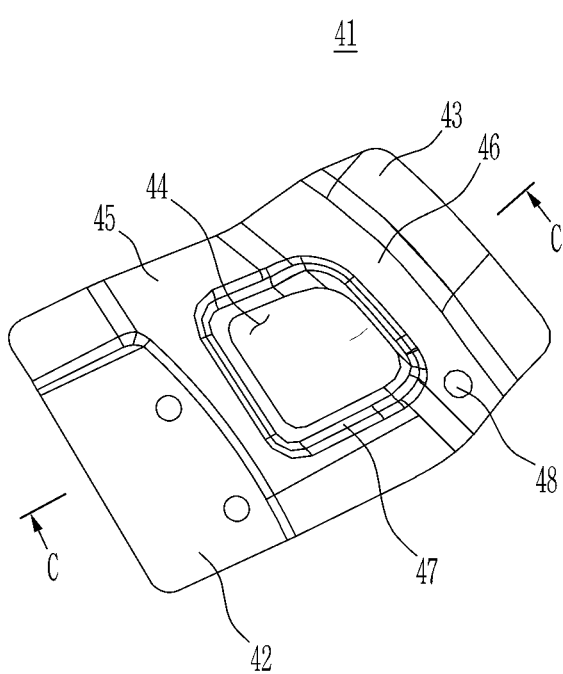
FIG. 7 is a perspective view showing a lower support bracket of a support bracket assembly applied to a fender mounting structure of a vehicle according to an exemplary form of the present disclosure.
Figure 8:
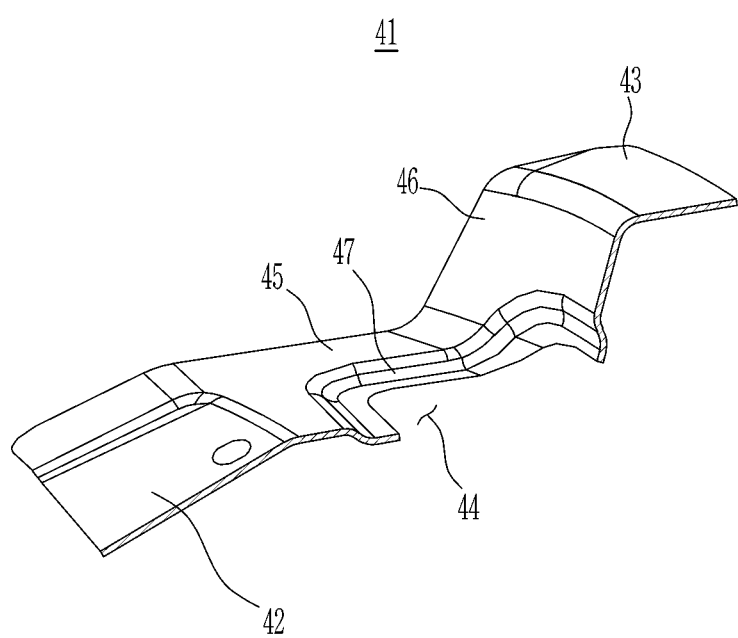
FIG. 8 is a cross-sectional perspective view along line C-C in FIG. 7.

FIG. 7 is a perspective view showing a lower support bracket of a support bracket assembly applied to a fender mounting structure of a vehicle according to an exemplary form of the present disclosure, and FIG. 8 is a cross-sectional perspective view along line C-C in FIG. 7.

Referring to FIG. 1 to FIG. 8, the lower support bracket 41 according to an exemplary form of the present disclosure includes a third welding surface 42 formed on one side to be connected to the lower surface of the fender apron upper member 5. And the lower support bracket 41 includes a fourth welding surface 43 formed on the other side to be joined to the lower surface of the upper support bracket 31.

The third welding surface 42 is spot welded to the lower surface of the fender apron upper member 5, and the fourth welding surface 43 may be spot welded to the lower surface of the upper support bracket 31.

Furthermore, the lower support bracket 41 includes an opening surface 45 with an opening 44 formed between the third and the fourth welding surface 42 43. The opening surface 45 serves to distribute the load acting on the upper support bracket 31.

In addition, the lower support bracket 41 includes a stepped portion 46 stepped upward from the opening surface 45 to the fourth welding surface 43. The stepped portion 46 lowers the opening surface 45 as much as possible and secures the maximum cross-section size of the lower support bracket 41.

Furthermore, the lower support bracket 41 further includes a third forming portion 47 formed from edge of the opening 44 of the opening surface 45 in a downward direction. The third forming portion 47 may increase or maximize the strength of the lower support bracket 41 and the strength of the upper support bracket 31.

And, a wiring clip mounting portion 48 for mounting the wiring clip between the third and the fourth welding surfaces 42, and 43 is formed on the stepped portion 46.

The above-described wiring clip mounting portion 48 establishes a wiring route under the upper support bracket 31, and is provided in the stepped portion 46 in the form of a hole into which the wiring clip is inserted.

Referring to FIG. 1 to FIG. 4, in an exemplary form of the present disclosure, the fender mounting bracket assembly 60 is for mounting the mount end 21 of the fender panel 20 to the outside along the vehicle width direction of the support bracket assembly 30.

The fender mounting bracket assembly 60 is for mounting the mount end 21 of the fender panel 20 to the outer flange 33 of the upper support bracket 31.

The mount end 21 of the fender panel 20 is spaced from the fender apron upper member 5 along the vehicle width direction by the support bracket assembly 30, and may be coupled to the panda mounting bracket assembly 60.

The fender mounting bracket assembly 60 is mounted on the outer flange 33 of the upper support bracket 31 along the vehicle width direction of the support bracket assembly 30, and is coupled with the mount end 21 of the fender panel 20.

Figure 9:
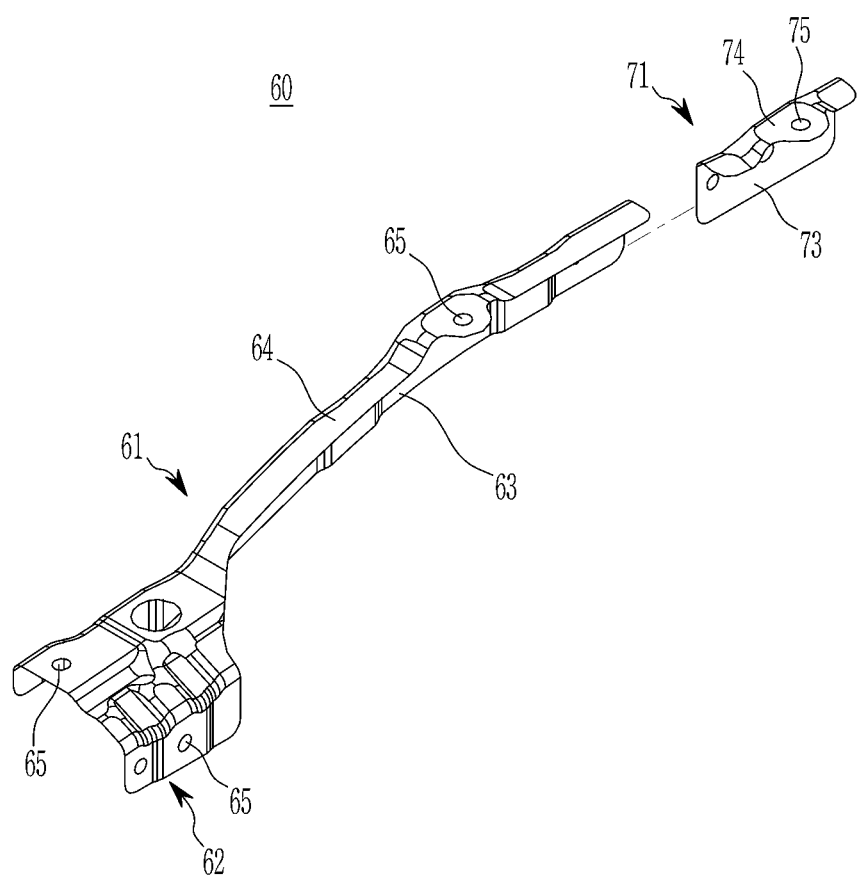
FIG. 9 is an exploded perspective view of a front fender mounting bracket and a rear fender mounting bracket of a fender mounting bracket assembly applied to a fender mounting structure of a vehicle according to an exemplary form of the present disclosure.

FIG. 9 is an exploded perspective view of a front fender mounting bracket and a rear fender mounting bracket of a fender mounting bracket assembly applied to a fender mounting structure of a vehicle according to an exemplary form of the present disclosure.

Referring to FIG. 1 to FIG. 9, the fender mounting bracket assembly 60 according to an exemplary form of the present disclosure includes a front fender mounting bracket 61 and a rear fender mounting bracket 71 that are separately coupled along the vehicle body length direction to the front and rear sides of the outer flange 33 of the upper support bracket 31.

That is, the fender mounting bracket assembly 60 may be provided in two pieces of the front fender mounting bracket 61 and the rear fender mounting bracket 71. The front fender mounting bracket 61 has a relatively longer length than the rear fender mounting bracket 71.

Since the fender mounting bracket assembly 60 is provided with two pieces of the front fender mounting bracket 61 and the rear fender mounting bracket 71, when assemble the fender panel 20 through the fender mounting bracket assembly 60, the assemble tolerance along the up and down directions can be reduced or minimized.

That is, in an exemplary form of the present disclosure, the upper and lower positions of the rear fender mounting bracket 71 are adjusted with respect to the front fender mounting bracket 61, and the front fender mounting bracket 61 and the rear fender mounting bracket 71 are joined to the outer flange 33 of the upper support bracket 31, and the assemble tolerance along the up and down directions of the fender panel 20 can be reduced or minimized.

In an exemplary form of the present disclosure, the front fender mounting bracket 61 includes mount reinforcement 62, a fifth welding surface 63, and a first mount surface 64.

The mount reinforcement 62 may have a "U"-shaped cross-section open in the downward direction, and is provided in front of the front fender mounting bracket 61. The U-shaped cross-section of the mount reinforcement 62 may be open in a downward direction.

The mount reinforcement 62 functions to increase the strength of a fender side garnish 23 (referring to FIG. 1) in the fender panel 20. The mount reinforcement 62 is joined to the front of the outer flange 33 of the upper support bracket 31, and may be combined with the mount end 21 of the fender panel 20 through the two-point fender mounting portion 65.

The fifth welding surface 63 is connected to the welding part, including the welding part of the mount reinforcement 62, and is joined to the outer flange 33 of the upper support bracket 31. The fifth welding surface 63 may be welded along the vehicle body length direction to the front side of the second welding surface 35 of the outer flange 33.

The first mount surface 64 is the upper surface connected to the fifth welding surface 63, which is connected to the mount end 21 of the fender panel 20.

Here, in the front fender mounting bracket 61, the fifth welding surface 63 and the first mount surface 64 are connected to the "L" cross-section. In addition, the first mount surface 64 may be coupled to the mount end 21 of the fender panel 20 through a fender mounting portion 65 of one point.

In an exemplary form of the present disclosure, the rear fender mounting bracket 71 includes a sixth welding surface 73 and a second mount surface 74.

The sixth welding surface 73 is joined to the rear side of the outer flange 33 of the upper support bracket 31, corresponding to the fifth welding surface 63 of the front fender mounting bracket 61. The sixth welding surface 73 may be welded along the vehicle body length direction to the rear side of the second welding surface 35 of the outer flange 33.

The second mount surface 74 is the upper surface connected to the sixth welding surface 73, and is connected to the mount end 21 of the fender panel 20.

In the rear fender mounting bracket 71, the sixth welding surface 73 and the second mount surface 74 are connected to the "L" cross-section. In addition, the second mount surface 74 may be coupled to the mount end 21 of the fender panel 20 through a fender mounting portion 75 of one point.

Hereinafter, the operation of the fender mounting structure 100 of the vehicle according to an exemplary form of the present disclosure configured as described above will be described.

In an exemplary form of the present disclosure, the support bracket assembly 30 connecting/supporting the fender apron upper member 5 and the fender mounting bracket assembly 60 in the vehicle width direction has the upper support bracket 31 and the lower support bracket 41.

Therefore, in an exemplary form of the present disclosure, sufficient strength may be imparted to the fender mounting bracket assembly 60 through the support bracket assembly 30 as described above.

In addition, in an exemplary form of the present disclosure, the fender mounting bracket assembly 60 connected to the outer surface of the support bracket assembly 30 includes the front fender mounting bracket 61 and rear fender mounting bracket 71 separately provided.

Thus, in an exemplary form of the present disclosure, the assemble tolerance along the up and down directions of the fender panel 20 may be reduced or minimized through the front fender mounting bracket 61 and the rear fender mounting bracket 71, so it can improve the assemble quality of the fender panel 20.

Furthermore, according to the fender mounting structure 100 of the vehicle according to an exemplary form of the present disclosure, when the hood panels 11 and 12 are opened, a member such as a fender side cover may not be exposed to the outside without exposing the wheel guard area to the outside, quality of the exterior may be enhanced, and freedom degree of the design may be increased.

The remaining effects of the fender mounting structure 100 of the vehicle according to an exemplary form of the present disclosure have been mentioned while describing the constituent element, and thus will be omitted.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

1: front side member
3: fender apron
5: fender apron upper member
7: hinge bracket
9: gas lifter
10: hood
20: fender panel
21: mount end
23: fender side garnish
30: support bracket assembly
31: upper support bracket
32: inner flange
33: outer flange
34: first welding surface
35: second welding surface
36: first forming portion
36a: first down flange
37: second forming portion
37a: second down flange
38: head lamp mounting portion
41: lower support bracket
42: third welding surface
43: fourth welding surface
44: opening
45: opening surface
46: stepped portion
47: third forming portion
48: wiring clip mounting portion
60: fender mounting bracket assembly
61: front fender mounting bracket
62: mount reinforcement
63: fifth welding surface
64: first mount surface
65, 75: fender mounting portion
71: rear fender mounting bracket
73: sixth welding surface
74: second mount surface
100: fender mounting structure

What is claimed is:

1. A fender mounting structure of a vehicle, comprising:
a support bracket assembly including an inner flange formed toward inside and an outer flange formed outside in a width direction of the vehicle, and wherein the support bracket assembly is mounted through the inner flange on an outer side of a fender apron upper member along the width direction, and disposed between the fender apron upper member and a mount end of a fender panel along the width direction; and
a fender mounting bracket assembly mounted on the outer flange of the support bracket assembly and connected to the mount end of the fender panel.

2. The fender mounting structure of claim 1, wherein the support bracket assembly includes:
an upper support bracket connected to the fender apron upper member; and
a lower support bracket disposed on a lower part of the upper support bracket.

3. The fender mounting structure of claim 2, wherein the fender mounting bracket assembly includes a front fender mounting bracket and a rear fender mounting bracket, which are respectively connected on front and rear sides of the outer flange of the support bracket assembly.

4. The fender mounting structure of claim 3, wherein the upper support bracket includes:
- a first welding surface formed on the inner flange and connected to the outer side of the fender apron upper member; and
- a second welding surface formed on the outer flange and connected to the front fender mounting bracket and the rear fender mounting bracket.

5. The fender mounting structure of claim 2, wherein the upper support bracket further includes a concave forming portion connected to the inner flange.

6. The fender mounting structure of claim 5, wherein the upper support bracket further includes a convex forming portion connected to the concave forming portion and the outer flange, wherein the convex forming portion is formed in parallel to the mount end of the fender panel.

7. The fender mounting structure of claim 6, wherein a down flange is formed at a front end of the concave forming portion and a front end of the convex forming portion, respectively.

8. The fender mounting structure of claim 2, wherein the lower support bracket includes:
- a first welding surface connected to a lower surface of the fender apron upper member; and
- a second welding surface connected to a lower surface of the upper support bracket.

9. The fender mounting structure of claim 8, wherein the lower support bracket further includes:
- an opening surface with an opening formed between the first welding surface and the second welding surface; and
- a stepped portion stepped upward from the opening surface to the second welding surface.

10. The fender mounting structure of claim 9, wherein the lower support bracket further includes a forming portion formed from an edge of the opening in a downward direction.

11. The fender mounting structure of claim 3, wherein the front fender mounting bracket includes a mount reinforcement formed at a front end having a U-shaped cross-section open in a downward direction.

12. The fender mounting structure of claim 11, wherein the front fender mounting bracket further includes:
- a first welding surface connected to the mount reinforcement and connected to an outer flange of an upper support bracket; and
- a first mount surface connected to the first welding surface and connected to the mount end of the fender panel.

13. The fender mounting structure of claim 12, wherein the rear fender mounting bracket includes:
- a second welding surface connected to the first welding surface and connected to the outer flange of the upper support bracket; and
- a second mount surface connected to the second welding surface and connected to the mount end of the fender panel.

* * * * *